(12) United States Patent
Belli et al.

(10) Patent No.: US 7,087,842 B2
(45) Date of Patent: Aug. 8, 2006

(54) ELECTRIC CABLE RESISTANT TO WATER PENETRATION

(75) Inventors: Sergio Belli, Leghorn (IT); Alberto Bareggi, Milan (IT); Paolo Veggetti, Monza (IT); Luca Castellani, Corsica (IT); Giovanni Pozzati, Olgiate Olona (IT); Luca Balconi, Bresso (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 10/168,065

(22) PCT Filed: Dec. 15, 2000

(86) PCT No.: PCT/EP00/12769

§ 371 (c)(1),
(2), (4) Date: Sep. 30, 2002

(87) PCT Pub. No.: WO01/46965

PCT Pub. Date: Jun. 28, 2001

(65) Prior Publication Data

US 2004/0065456 A1 Apr. 8, 2004

Related U.S. Application Data

(60) Provisional application No. 60/171,612, filed on Dec. 23, 1999.

(30) Foreign Application Priority Data

Dec. 20, 1999 (EP) .................................. 99125367

(51) Int. Cl.
*H01B 7/00* (2006.01)

(52) U.S. Cl. .............................. 174/110 R; 174/113 R; 174/120 R

(58) Field of Classification Search ............ 174/110 R, 174/113 R, 102 R, 102 SC, 102 C, 103, 174/106 R, 106 SC
See application file for complete search history.

(56) References Cited

U.S. PATENT DOCUMENTS

| | | | | |
|---|---|---|---|---|
| 3,775,548 | A | * 11/1973 | Zinser et al | 174/23 C |
| 3,823,255 | A | * 7/1974 | La Gase et al. | 174/113 R |
| 3,843,568 | A | * 10/1974 | Woodland et al. | 521/54 |
| 4,095,039 | A | 6/1978 | Thompson | |
| 4,104,210 | A | 8/1978 | Coran et al. | |
| 4,145,567 | A | 3/1979 | Bahder et al. | |
| 4,631,229 | A | * 12/1986 | Martens et al. | 428/343 |
| 4,703,132 | A | * 10/1987 | Marciano-Agostinelli et al. | 174/23 C |
| 4,867,526 | A | 9/1989 | Arroyo | |
| 4,916,198 | A | 4/1990 | Scheve et al. | |
| 4,963,695 | A | * 10/1990 | Marciano-Agostinelli et al. | 174/23 C |
| 5,010,209 | A | * 4/1991 | Marciano-Agostinelli et al. | 174/23 C |

(Continued)

FOREIGN PATENT DOCUMENTS

CH     486 753     2/1970

(Continued)

*Primary Examiner*—William H. Mayo, III
(74) *Attorney, Agent, or Firm*—Finnegan, Henderson, Farabow, Garrett & Dunner, L.L.P.

(57) ABSTRACT

Electric cable (20), in particular for power transmission or distribution at medium or high voltage, comprising a metallic screen (5) and a water swellable layer (21) capable of forming a barrier to the water penetration provided in a position radially external to said metallic screen (5). Said water swellable layer (21) is made of an expanded polymeric material in which a water swellable material preferably in the form of powder, is embedded.

25 Claims, 3 Drawing Sheets

U.S. PATENT DOCUMENTS

| | | | |
|---|---|---|---|
| 5,049,593 A | * | 9/1991 | Marciano-Agostinelli et al. ............... 523/173 |
| 5,089,329 A | * | 2/1992 | de Vrieze et al. ........ 428/313.5 |
| 5,221,781 A | * | 6/1993 | Aida et al. ................. 524/433 |
| 5,281,757 A | * | 1/1994 | Marin et al. .............. 174/23 R |
| 5,413,747 A | * | 5/1995 | Akers et al. ................ 264/211 |
| 5,698,615 A | * | 12/1997 | Polle .......................... 523/173 |
| 5,898,044 A | * | 4/1999 | Nooren ...................... 428/323 |
| 6,184,473 B1 | * | 2/2001 | Reece et al. ............ 174/110 R |
| 6,215,070 B1 | * | 4/2001 | King .................... 174/110 R |
| 6,242,692 B1 | * | 6/2001 | King .......................... 174/36 |
| 6,455,769 B1 | * | 9/2002 | Belli et al. ................ 174/23 C |
| 6,565,779 B1 | * | 5/2003 | Kharazi .................... 264/37.1 |

FOREIGN PATENT DOCUMENTS

| | | | |
|---|---|---|---|
| EP | 0 271 171 A1 | | 6/1988 |
| EP | 0 324 430 B1 | | 7/1989 |
| EP | 0 732 374 A2 | * | 3/1996 |
| GB | 2080998 A | * | 2/1982 |
| JP | 60-150506 | * | 1/1984 |
| JP | 04-230913 | * | 8/1992 |
| JP | 2004-458184 A | * | 6/2004 |
| WO | WO 98/52197 | | 11/1998 |
| WO | WO 98/52197 A | * | 11/1998 |
| WO | WO 99/33070 | | 7/1999 |

* cited by examiner

ELECTRIC CABLE RESISTANT TO WATER PENETRATION

CROSS REFERENCE TO RELATED APPLICATIONS

This application is a national phase application based on PCT/EP00/12769, filed Dec. 15, 2000, the contents of which are incorporated herein by reference, and claims the priority of European patent application no. 99125367.5, filed Dec. 20, 1999, and the benefit of U.S. Provisional Application No. 60/171,612, filed Dec. 23, 1999, the contents of which are incorporated herein by reference.

BACKGROUND OF THE INVENTION

1. Field of the Invention

The present invention relates to an electric cable, in particular for power transmission or distribution at medium or high voltage, provided with a water swellable layer suitable to form a barrier to the water penetration in a position radially external to the metallic screen.

In the present description, the term "medium voltage" means a voltage of between about 1 kV and about 30 kV, while the term "high voltage" means voltages above 30 kV.

2. Description of the Related Art

Cables for power transmission or distribution at medium or high voltage generally have a metallic conductor coated, respectively, with a first inner semiconducting layer, an insulating layer and an outer semiconducting layer. In the course of the present description this predetermined sequence of elements will be indicated by the term "core".

In a position radially external to the aforementioned core, said cable is provided with a metallic screen, usually of aluminium, lead or copper, inside which the aforementioned core is enclosed, said metallic screen generally consisting of a continuous tube or of a metallic tape shaped according to a tubular form and welded or sealed to ensure hermeticity.

Thus, said screen has a dual role: on the one hand it provides hermeticity against the exterior of the cable by interposing a barrier to water penetration in the radial direction, and on the other hand it performs a function of an electrical nature by creating, inside the cable, as a result of direct contact between the metallic screen and the outer semiconducting layer of said core, a uniform electric field of the radial type, and at the same time cancelling the external electric field of said cable. Yet another function is that of withstanding short-circuit currents.

In a configuration of the unipolar type, said cable has, finally, an outer polymeric sheath in a position radially external to the metallic screen mentioned above.

Cables for power transmission or distribution are, moreover, generally provided with one or more layers specifically placed to achieve a barrier effect able to block any water penetration towards the interior (the core) of the cable.

Ingress of water to the interior of a cable is a particularly undesirable aspect since, in the absence of suitable solutions designed to plug the water, once the latter has penetrated it is able to flow freely inside said cable. This is particularly harmful in terms of the integrity of the latter as problems of corrosion may develop within it, as well as problems of accelerated ageing of the cable itself with deterioration of the electric features of the insulating layer (especially when the latter is made of cross-linked polyethylene), a phenomenon that is better known by the term "water treeing" and that is manifested by the formation of microscopic channels in a branch structure ("trees") due to the combined action of the electric field generated by the passage of current in the conductor, and of moisture that has penetrated inside said insulating layer.

This means, therefore, that in the case of water penetration to the interior of a cable, the latter will have to be replaced. Moreover, once water has reached joints, terminals or any other equipment connected to one end of the cable, the water not only stops the latter from performing its function, but also damages said equipment, in most cases causing damage that is irreversible and significant in economic terms.

Water penetration to the interior of a cable may occur through multiple causes, especially when said cable forms part of an underground installation. Such penetration can occur, for example, by simple diffusion of water through the outer polymeric sheath of the cable or as a result of abrasion, accidental impact or the action of rodents, factors that can lead to an incision or even to rupture of the outer sheath of the cable and, therefore, to the creation of a preferred route for ingress of water to the interior of the cable.

Numerous solutions are already known for tackling these problems. Of these, we may mention, for example, the use of hydrophobic and water swellable compounds, in the form of powders or gel, which are placed inside the cable at various positions depending on the type of cable being considered.

For example, said compounds may be placed in a position radially internal to the metallic screen, more precisely in a position between the cable core and its metallic screen, or in a position radially external to said metallic screen, generally in a position directly beneath the outer polymeric sheath, or in both the aforesaid positions simultaneously.

The water swellable compounds, as a result of contact with water, have the capacity to expand in volume and thus prevent longitudinal propagation of the water by interposing a physical barrier to its free flow. This solution thus makes it possible to restrict the damage to a section of cable of limited length, so that, once identified, the damaged section can be replaced safeguarding any equipment connected to it.

According to a known solution, for the purpose of facilitating the application of said water swellable material, the cable is provided with a tape, with which the aforementioned material is combined. In more detail, said tape is helicoidally or longitudinally wound on a suitable element of the cable itself, differing from one instance to another and depending, as mentioned, on the type of cable under consideration and on the positioning, radially internal or external to the metallic screen, of the barrier that is to be produced.

This tape can, for example, consist of a pair of fabrics of a cellulosic material, superimposed on one another in such a way that, in the space between said pair of fabrics, the water swellable powder as mentioned above can easily be placed; According to a different embodiment, for the purpose of reducing its thickness, said tape is made of a material that is sufficiently compressible and porous to permit trapping of a water swellable or super-absorbent material (see, for example, patent U.S. Pat. No. 4,867,526). According to a further embodiment of the known state of the art, said tape consists of a super-absorbent fibre material arranged linearly along the cable or helicoidally wound on said cable or on predetermined portions of the cable.

For the purpose of providing a barrier to water penetration in a position radially internal to the metallic screen, another known technique is to provide the outer semiconducting layer of the cable core with a plurality of longitudinal channels, preferably with V profile, in which a water swellable powder material is placed.

Document WO 99/33070 describes the use of a layer of expanded polymeric material arranged in direct contact with the core of a cable, in a position directly beneath the metallic screen of the cable, and possessing predefined semiconducting properties with the aim of guaranteeing the necessary electrical continuity between the conducting element and the metallic screen.

The technical problem faced in WO 99/33070 was that the covering layers of a cable are continuously subjected to mechanical expansions and contractions due to the numerous thermal cycles that the cable undergoes during its normal use. Said thermal cycles, caused by the diurnal variations in strength of the electric current being carried, which are associated with corresponding temperature variations inside the cable itself, lead to the development of radial stresses inside the cable which affect each of said layers and, therefore, also its metallic screen. This means, therefore, that the latter can undergo relevant mechanical deformations, with formation of empty spaces between the screen and the outer semiconducting layer and possible generation of non-uniformity in the electric field, or even resulting, with passage of time, in rupture of the screen itself.

This problem was solved by inserting, under the metallic screen, a layer of expanded polymeric material capable of absorbing, elastically and uniformly along the cable, the aforementioned radial forces of expansion/contraction so as to prevent possible damage to the metallic screen.

Furthermore, document WO 99/33070 discloses that, inside said expanded polymeric material, positioned beneath the metallic screen, a water swellable powder material is embedded, which is able to block moisture and/or small amounts of water that might penetrate to the interior of the cable even under said metallic screen.

Document WO 98/52197 describes the structure of a cable for power transmission comprising, preferably in a position directly beneath the outer polymeric covering sheath, a covering of expanded polymeric material of suitable thickness, capable of endowing the cable with high impact strength. This strength therefore makes it possible to eliminate the traditional metallic protective armours. Document WO 98/52197 makes no mention of the problem of water penetration to the interior of such a cable.

SUMMARY OF THE INVENTION

Now, the Applicant set himself the objective of finding a remedy for the problem of water penetration to the interior of a cable in the radially outermost layers of the latter, i.e. in a position radially external to the metallic screen, more precisely in a position directly beneath the outer polymeric sheath of said cable.

In the Applicant's perception, in fact, it is of fundamental importance to provide the cable with a barrier effect to the water penetration especially in the vicinity of the radially outermost layer, i.e. as close as possible to the outer polymeric sheath, the latter being the element in direct contact with the environment and therefore most exposed to any impact and/or abrasion that might lead to the formation of cracks or actual ruptures with consequent formation of preferred routes for ingress of water.

The practical solutions of the state of the art, and mentioned above in the course of the present description, exhibit, in the Applicant's opinion, a plurality of drawbacks that are solved by the present invention, as will be made clearer by the following explanation.

A first disadvantage, for example, is that the use of a water swellable material, whether in the form of powder or gel, to be placed in internal regions of a cable that have been left empty or in the aforementioned longitudinal channels of the semiconducting layer, leads to numerous problems especially at the stage of manufacture of the cable itself.

Said free powders as such, i.e. not bound to any support, are difficult to apply to the cable during manufacture of the latter, making the production process particularly laborious.

Moreover, the use of free powders does not ensure complete filling of the empty spaces inside the cable, nor the creation of a water swellable layer that is uniform over the entire length of the cable and therefore does not guarantee the formation of an effective barrier to water penetration.

Another drawback of the known art is that said free powder, located inside the cable, can easily be dispersed into the environment during cable installation, as well as creating problems of interference with the traditional processes of welding or gluing when it is necessary to make joints between two pieces of cable or connections between a cable and a terminal or any equipment whatever.

On the other hand, use of a water swellable material, for example in the form of powder, combined with a supporting material in the form of tape, such as one of the tapes of the known art mentioned above, although solving some of the problems associated with free powders, leads to various additional problems especially in the stage of manufacture of said cable.

In fact, the cable taping stage, i.e. the application of a water swellable tape (meaning by water swellable tape, a tape that is combined with a water swellable material), represents an additional stage of the cable manufacturing process requiring, besides, the use of equipment dedicated to this particular operation.

In more detail, in order to produce a barrier to the penetration of water in a location radially external to the metallic screen of a cable by means of the known taping technology, the production process, e.g. of a single-core cable, necessarily comprises:

- a first line dedicated to extrusion of the cable core which, once obtained, is wound onto a first collecting reel;
- a second line, different from the first and supplied with a core unwound from an aforementioned first reel, for positioning of the metallic screen and for application of the water swellable tape; the intermediate thus obtained is then wound onto a second collecting reel;
- a third line supplied with said intermediate and intended for extrusion of the outer polymeric sheath for covering the water swellable tape and completing the cable production process.

The second line, if necessary, can be dedicated purely to positioning of the metallic screen, the taping step being carried out in this case on the third line, prior to the extrusion step of the outer polymeric sheath. However, this method of working proves to be disadvantageous since on the same line there would be both a typically batch process, i.e. the taping step as traditionally executed, and a typically continuous process, namely the extrusion operation.

Therefore, the Applicant has perceived the importance of providing a water swellable layer capable of forming a barrier to the penetration of water, in a position radially external to the metallic screen, employing a method of working of the continuous type that makes it possible to eliminate the taping step of the known art. Said step inevitably introduces a discontinuity in the cable production process which affects it both in terms of decreased productivity, and in terms of increased costs at plant engineering level.

The Applicant has found that, in order to provide a continuous water swellable layer with properties of a barrier to water penetration in a position radially external to the metallic screen of a cable, the water swellable tape of the prior art can be replaced effectively and advantageously by a layer of expanded polymeric material inside which a water swellable material is embedded, for example in the form of powder. Said layer according to the invention is a continuous layer that is distributed uniformly along the length of the cable, without any superposition, even partial, of portions of said layer.

Said layer of expanded material with water swellable properties can be extruded directly onto the cable in a continuous operation, possibly also simultaneously with deposition of the outer polymeric sheath (using a co-extrusion process).

Furthermore, the water swellable layer according to the invention performs not only the function of absorbing any moisture present inside the cable, but is able to block the longitudinal movement of water that has accidentally penetrated under the outer polymeric sheath even in remarkable quantities.

Therefore, according to a first aspect the present invention relates to an electric cable comprising at least one conductor, an insulating covering, a metallic screen located externally to said insulating covering and at least one water swellable layer positioned radially external to said metallic screen, characterized in that said at least one water swellable layer is made of an expanded material in which a water swellable material is embedded to form a barrier to water penetration.

In accordance with the present invention, said water swellable layer is a continuous layer that is distributed uniformly along the longitudinal direction of said cable.

The degree of expansion of said water swellable layer is generally between 5% and 500%, preferably between 10% and 200%, and more preferably between 10% and 50%.

Moreover, the thickness of said water swellable layer is between 0.3 mm and 6 mm, preferably between 1 mm and 4 mm, and the amount of said water swellable material is between 1 phr and 120 phr, preferably between 5 phr and 80 phr.

According to a second aspect, the present invention relates to a method of blocking the longitudinal flow of water that has accidentally penetrated to the interior of an electric cable, in a portion of the latter radially external to at least one metallic screen possessed by said cable, characterized in that a water swellable layer is provided in a position radially external to said at least one metallic screen, said water swellable layer being made of an expanded material in which a water swellable material is embedded.

Further characteristics and advantages will become clearer in the light of the following description of two preferred embodiments of the present invention.

BRIEF DESCIPTION OF THE DRAWING

The description, presented hereunder, makes reference to the accompanying drawings, supplied solely for the purpose of explanation without any restrictive intention, in which.

DETAILED DESCIPTION OF THE INVENTION

Figure 1:
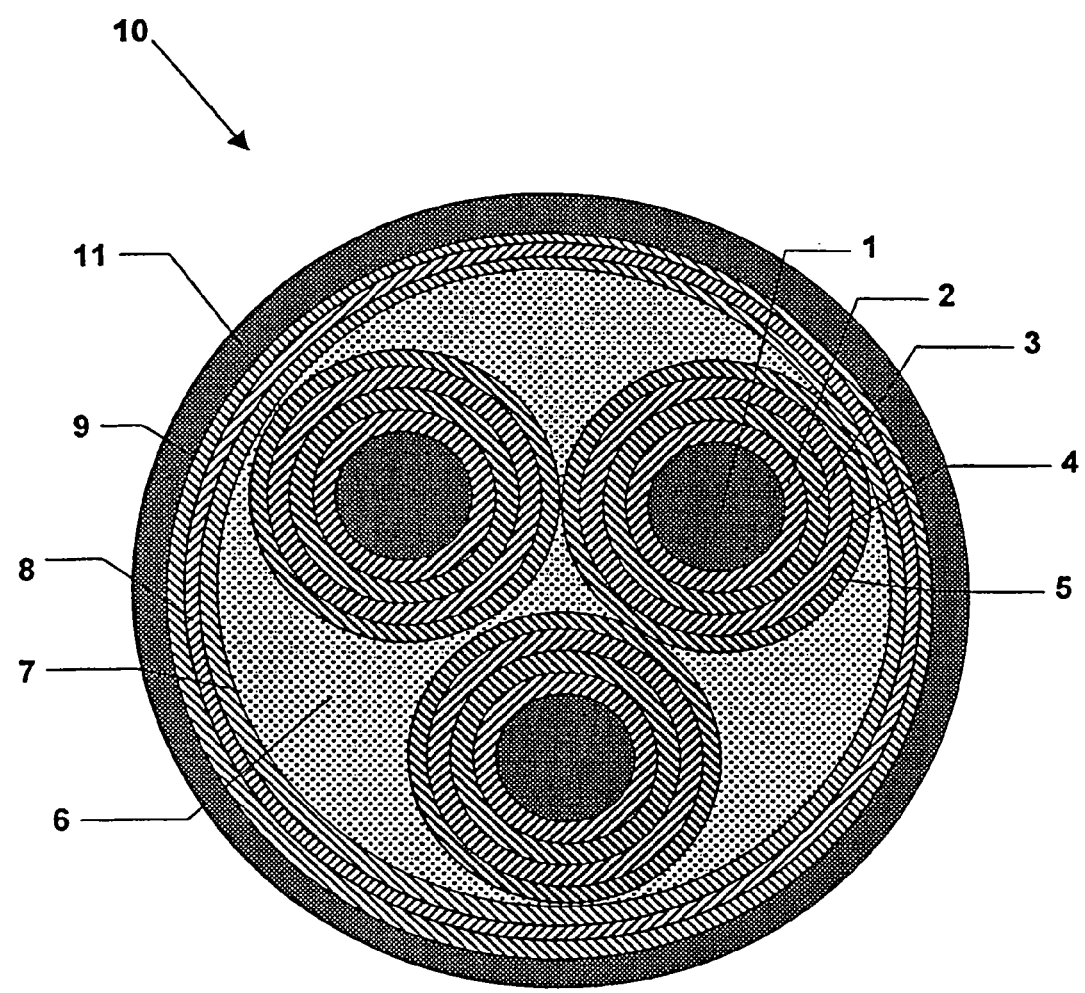
FIG. 1 shows a cable for the transmission of power according to the state of the art, of the three-core type with metallic armour.

In the following of the present description, the term "expanded polymeric material" means a polymeric material with a predetermined percentage of "free" space inside the material, i.e. a space not occupied by the polymeric material, but by gas or air.

In general, said percentage of free space in an expanded polymer is expressed by the so-called "degree of expansion" (G), defined as follows:

$$G=(d_0/d_e-1)*100$$

where $d_0$ denotes the density of the unexpanded polymer and de denotes the apparent density measured on the expanded polymer.

As already emphasized, the Applicant has found that it is possible to produce a water swellable layer that is able to form a barrier to the penetration of water, in a position radially external to the metallic screen of a cable, by embedding, within an expanded polymeric material, a water swellable material, preferably in the form of powder, which is capable of expanding on contact with water and, thus, of preventing the longitudinal propagation of any water that has penetrated into said cable.

Said water swellable material generally consists of a polymer that has hydrophilic groups along the polymeric chain, for example: polyacrylic acid that has been cross-linked and at least partially salified (for example the products Cabloc® from C. F. Stockhausen GmbH, or Waterlock® from Sanyo); starch or its derivatives mixed with acrylamide/sodium acrylate copolymers (for example the products SGP Absorbent Polymer® from Henkel AG); sodium carboxymethylcellulose (for example the products Blanose® from Hercules Inc.).

The expanded polymeric material used in the water swellable layer generally consists of an expandable polymer. If necessary said polymer, after expansion, can be submitted to cross-linking, as described in greater detail in the following of the present description.

Said expandable polymer can be selected from the group comprising: polyolefins, copolymers of various olefins, olefins/unsaturated esters copolymers, polyesters, polycarbonates, polysulphones, phenolic resins, urea resins, and their mixtures. Examples of suitable polymers are: polyethylene (PE), in particular low-density PE (LDPE), medium-density PE (MDPE), high-density PE (HDPE) and linear low-density PE (LLDPE); polypropylene (PP); ethylene-propylene elastomeric copolymers (EPM) or ethylene-propylene-diene terpolymers (EPDM); natural rubber; butyl rubber; ethylene/vinyl ester copolymers, for example ethylene/vinyl acetate (EVA); ethylene/acrylate copolymers, in particular ethylene/methylacrylate (EMA), ethylene/ethylacrylate (EEA), ethylene/butylacrylate (EBA); ethylene/α-olefin thermoplastic copolymers; polystyrene; acrylonitrile-butadiene-styrene resins (ABS); halogenated polymers, in particular polyvinyl chloride (PVC); polyurethane (PUR); polyamides; aromatic polyesters, such as polyethylene terephthalate (PET) or polybutylene terephthalate (PBT); and their copolymers or mechanical blends.

Preferably, the polymeric material is a polyolefinic polymer or copolymer based on ethylene and/or propylene, and in particular is selected from among:

(a) copolymers of ethylene with an ethylenically unsaturated ester, for example vinylacetate or butylacetate, in which the amount of unsaturated ester is generally between 5% and 80% by weight, and preferably between 10% and 50% by weight;

(b) elastomeric copolymers of ethylene with at least one $C_3$–$C_{12}$ α-olefin, and optionally a diene, preferably ethylene-propylene (EPR) or ethylene-propylene-diene (EPDM) copolymers, preferably with the following composition: 35–90 mol. % of ethylene, 10–65 mol. % of α-olefin, 0–10 mol. % of diene (for example 1,4-hexadiene or 5-ethylidene-2-norbornene);

(c) copolymers of ethylene with at least one $C_4$–$C_{12}$ α-olefin, preferably 1-hexene, 1-octene and the like, and optionally a diene, generally having a density of between 0.86 and 0.90 g/cm$^3$ and the following composition: 75–97 mol. % of ethylene, 3–25 mol. % of α-olefin, 0–5 mol. % of a diene;

(d) polypropylene modified with ethylene/$C_3$–$C_{12}$ α-olefin copolymers, where the weight ratio between polypropylene and the ethylene/$C_3$–$C_{12}$ α-olefin copolymer is between 90/10 and 30/70, and preferably between 50/50 and 30/70.

For example, category (a) includes the commercial products Elvax® (Du Pont), Levapren® (Bayer), Lotryl® (Elf-Atochem); category (b) includes the products Dutral® (Enichem) or Nordel® (Dow-Du Pont), and category (c) includes the products Engage® (Dow-Du Pont) or Exact® (Exxon), whereas polypropylene modified with ethylene/α-olefin copolymers is marketed with the trade-names Moplen® or Hifax® (Montell), or Fina-Pro® (Fina), and the like.

Particularly preferred, in category (d), are the thermoplastic elastomers comprising a continuous matrix of a thermoplastic polymer, for example polypropylene, and small particles (generally with a diameter of the order of 1–10 μm) of a vulcanized elastomeric polymer, for example cross-linked EPR or EPDM, dispersed in the thermoplastic matrix. The elastomeric polymer can be incorporated in the thermoplastic matrix in the unvulcanized state and can then be cross-linked dynamically during the process by adding a suitable amount of a cross-linking agent. Alternatively, the elastomeric polymer can be vulcanized separately and then can be dispersed in the thermoplastic matrix in the form of small particles. Thermoplastic elastomers of this type are described, for example, in documents U.S. Pat. No. 4,104,210 or EP-324,430.

Among the polymeric materials, particular preference has been given to a polypropylene with high mechanical strength in the molten state (high melt strength polypropylene), as described for example in patent U.S. Pat. No. 4,916,198, commercially available under the trade name Profax® (Montell S.p.A.). Said document illustrates a process for production of said polypropylene by means of a stage of irradiation of a linear polypropylene carried out using high-energy ionizing radiation for a sufficient period of time to cause the formation of a large quantity of long branchings of the chain, said phase being followed by a suitable treatment of the irradiated material so as to deactivate substantially all of the free radicals present in the irradiated material.

Even more preferably, particularly preferred among the polymeric materials is a polymeric composition comprising the aforementioned polypropylene with high degree of branching, in an amount generally between 30 wt. % and 70 wt. %, mixed with a thermoplastic elastomer of the type belonging to category (d) as stated above, in an amount generally between 30 wt. % and 70 wt. %, said percentages being expressed relative to the total weight of the polymeric composition. Said polymeric composition is particularly advantageous since the water swellable material can be embedded easily and effectively within said composition, which, added with the water swellable material, does not exhibit any problem during the expansion process for forming the water swellable layer of the present invention. Moreover, using said polymeric composition, it is possible to produce a water swellable layer that is continuous and uniform along the entire length of the cable, and has satisfactory impact strength owing to the high flexural modulus of the polymeric composition employed, said modulus being equal to about 500 MPa.

Said aspect, as noted above, is particularly advantageous as it makes it possible to obviate the inclusion of the metallic armour, with a consequent decrease in total weight of the cable and lower production costs of said cable.

A cable (10) for power transmission at medium voltage according to the state of the art is shown in cross section in FIG. 1.

Said cable (10) is of the three-core type and comprises three conductors (1), each covered with an inner semiconducting covering (2), a layer of insulating material (3) and an outer semiconducting layer (4). Said semi-finished structure, as mentioned above, has been defined by the term of "core". A metallic screen (5), for example a screen consisting of copper tapes, is located in a position radially external to said core.

The three cores, each provided with its own metallic screen (5), are stranded together and the star-shaped areas obtained between them are filled with a filler (6) (generally elastomeric mixtures based on EPR and filled with recovered material, e.g. calcium carbonate) so as to give the structure a circular section, the whole being covered in turn with an inner polymeric sheath (7), a water-swellable tape (8) which performs the function of a barrier to the penetration of water, a metallic armour (9) and an outer polymeric sheath (11). The metallic armour (9) can consist of metal wires, for example steel wires, of a metallic screen in the form of a continuous tube—of aluminium, lead or copper—or of a metal strip in the form of a tube and welded or sealed with an adhesive that is able to ensure a suitable hermeticity.

A variant (not shown) of said type of cable (10) of the known art envisages positioning of a water swellable tape also in a position radially internal to the metallic screen, immediately beneath the latter, to provide a barrier to penetration of water also in the cable part internal to the metallic screen. According to said particular embodiment, in view of the particular location of said tape, the latter necessarily possesses suitable semiconducting properties, conferred by the presence of an electrically conducting carbon black, such as acetylene black, electrically conducting furnace black or the like, combined with said tape. According to further embodiments (not shown) of the known art, said tape, impregnated with water swellable powder, can also be located externally to the metallic screen possessed by each conductor.

A further variant (not shown) of said type of cable (10) of the known art can envisage the use of a thin aluminium foil arranged externally to the metallic armour (9), for example glued beneath the outer polymeric sheath (11), said aluminium foil acting as a barrier-to water penetration in the radial direction.

Figure 2:
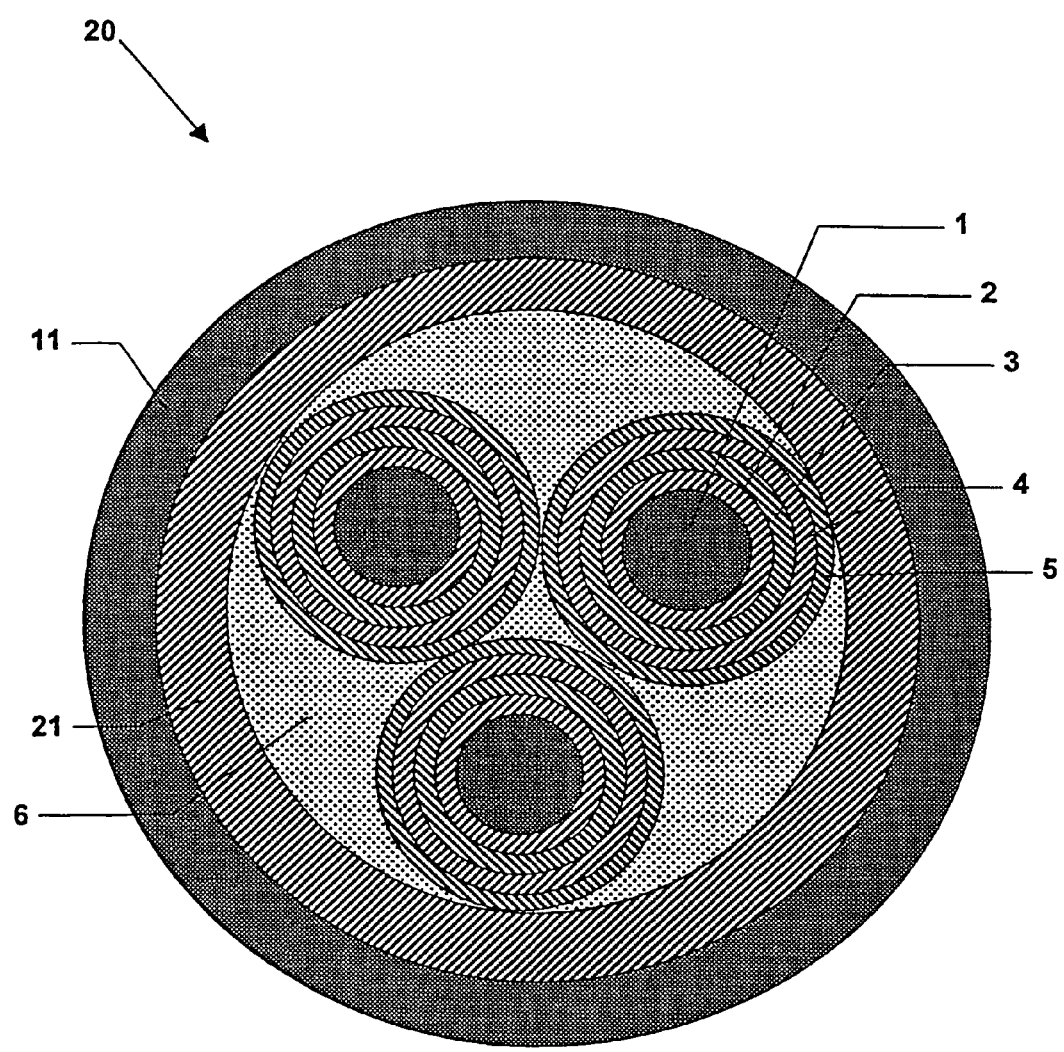
FIG. 2 shows a first embodiment of a cable according to the invention of the three-core type.

FIG. 2 shows, in cross section, a first embodiment of a cable (20) according to the present invention, of the three-core type, for medium-voltage power transmission.

For simplicity of description, in the appended drawings similar or identical components have been given the same numerical signs.

The cable (20) of the invention comprises: three conductors (1), each covered with an inner semiconducting covering (2), an insulating layer (3), an outer semiconducting layer (4) defining the aforementioned "cores", each of which is provided, in a radially external position, with a metallic screen (5).

The star-shaped areas defined between the aforementioned cores, covered with the metallic screen (5), are filled, as in the case of FIG. 1, with a filler (6).

Externally to the latter, the cable (20) according to the present invention has a water swellable layer (21) of expanded polymeric material in which a water swellable material, preferably in powder form, is embedded, said layer (21) performing the function of providing an effective barrier to the water penetration to the interior of the cable.

In a position radially external to said water swellable layer (21), the cable (20) can also have a tubular element (not shown) consisting, for example, of a thin foil or sheath of aluminium, welded or extruded, capable of performing the function of blocking the penetration of water in the radial direction.

Finally, said water swellable layer (21) is covered with an outer polymeric sheath (11).

In accordance with the embodiment illustrated, the water swellable layer (21), completely replacing the metallic armour (9), also performs a function of protection of the cable against accidental impacts that might occur.

Thus, as is known, the traditional metallic armour (9) performs the function of mechanically protecting the cable against accidental impacts that can occur, for example, during transport, laying, etc., and can seriously damage the cable structure. For example, such impacts can give rise to deformations of the insulating layer, causing variations in the electrical gradient of the insulating covering and, as a consequence, a decrease in its insulating capacity, or separation between the insulating and semiconducting layers, giving rise to partial discharges which may lead to premature ageing and/or puncturing of the cable.

According to one embodiment (not shown) it is, however, possible to provide armour (9) of the traditional type, described above, in a position underneath the outer polymeric sheath (11).

Figure 3:
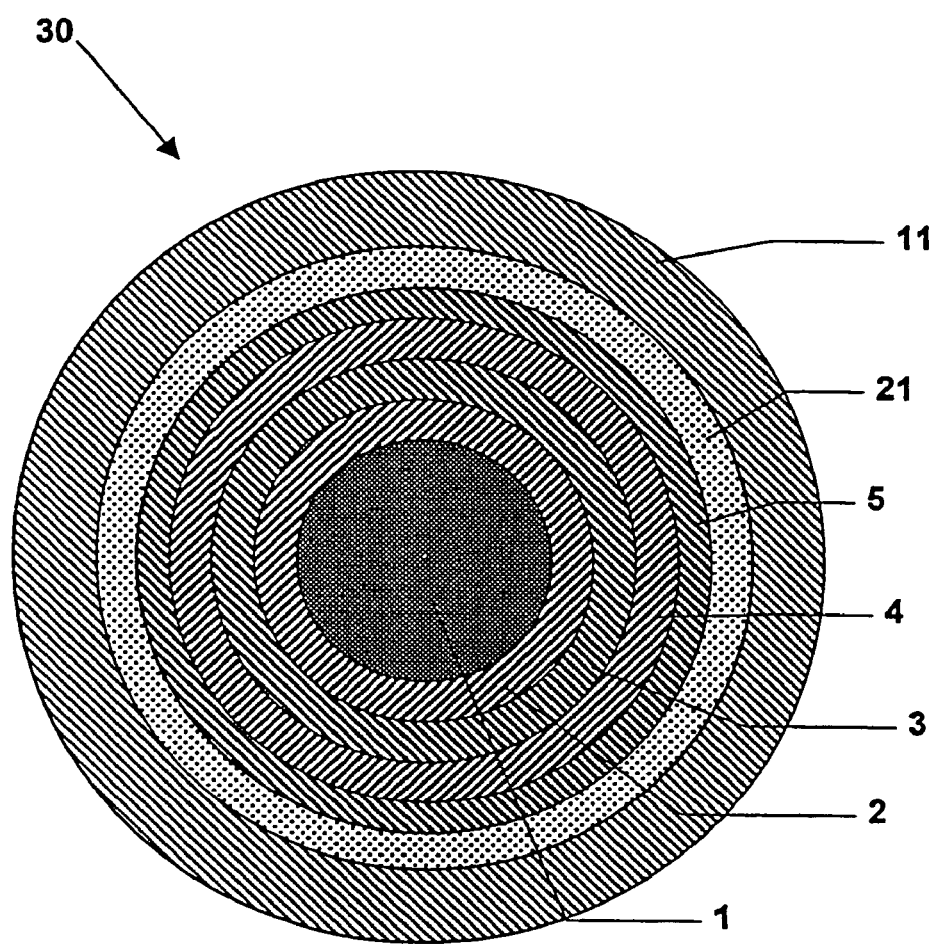
FIG. 3 shows a second embodiment of a cable according to the invention of the single-core type.

FIG. 3 shows, in cross section, a second embodiment of a cable (30) for medium-voltage power transmission according to the present invention, said cable being of the single-core type.

This cable (30) comprises a central conductor (1), covered with an inner semiconducting covering (2), an insulating layer (3), an outer semiconducting layer (4) and a metallic screen (5).

In accordance with the present invention, in a position radially external to said metallic screen (5), the cable (30) has a water swellable layer (21) of expanded polymeric material, in which a water swellable material as described above is embedded.

Finally, the cable (30) has an outer polymeric sheath (11) external to said layer (21).

Similarly to the foregoing description for the three-core case with reference to FIG. 2, the water swellable layer (21) of the single-core cable (30) was suitably dimensioned so that it also performs a function of protection of said cable against possible accidental impacts, completely replacing any metallic armour (9) of the known art.

According to one variant (not shown), in a position radially external to the outer semiconducting layer, the single-core cable (30) of the invention can have a tape that is impregnated with a water swellable powder of known type for the purpose of providing a barrier to the water penetration also in a position radially internal to the metallic screen (5) or it can have an expanded semiconducting layer as described in WO 99/33070.

The figures illustrated above show only some of the possible embodiments of cables in which the present invention can be advantageously employed.

In fact, it is apparent that suitable modifications can be made to the embodiments mentioned above, without implying limitations to application of the present invention. For example, it is possible to envisage cores with sectorial cross section, so that when said cores are combined the resulting cable cross section is almost circular, without the need to use filler for the star-shaped areas; the water swellable layer (21) and then the outer polymeric sheath (11) are extruded directly onto these combined cores.

In the case of cables for low-voltage power transmission, the construction of the said cables will normally comprise the single insulating covering directly in contact with the conductor, covered in its turn with the covering of expanded polymeric material in which the water swellable powder is embedded, and the outer polymeric sheath.

Further measures are known to a person skilled in the art, who is able to assess the most suitable solution, in relation for example to the costs, the type of cable laying (above ground, inserted in conduits, buried directly in the ground, inside buildings, undersea, etc.) and the working temperature of the cable (maximum and minimum temperatures, thermal fluctuations of the environment).

With regard to the manufacturing process of a cable according to the present invention, the main steps characterizing the aforesaid process in the case when a single-core cable is produced are presented in the following. If the manufacture of a multi-core cable for example of the three-core type is carried out, the process described for a single-core cable can be suitably modified on the basis of the information supplied and the technical knowledge possessed by the average person skilled in the art.

The semiconducting layers, inner (2) and outer (4), produced according to known techniques, in particular by extrusion, are applied to a conductor (1), unwound from a suitable reel, selecting a polymeric material and a carbon black from among those mentioned above.

Similarly, also the insulating layer (3), arranged in a position between said semiconducting layers (2, 4) is preferably obtained by extrusion of a polyolefin selected from those mentioned above, in particular polyethylene, polypropylene, ethylene-propylene copolymers, and the like.

At the end of the extrusion step, the material is preferably cross-linked according to known techniques, for example by means of peroxides or via silanes.

Alternatively, the cable core, i.e. the assembly of conductor (1), inner semiconducting layer (2), insulating layer (3) and outer semiconducting layer (4), can also be produced by means of a co-extrusion process of the aforesaid layers according to known techniques. Once completed, the core is stored on a first collecting reel.

In a different line of the manufacturing plant, the core is unwound from said first reel and a metallic screen (5) is applied to it by known means. For example, a tape screening machine is used, which places thin copper sheets (for example with thickness equal to 0.1–0.2 mm) helicoidally, by means of suitable rotating heads, preferably overlapping the edges of said sheets by an amount equal to about 33% of their area.

Alternatively, said metallic screen can consist of a plurality of copper wires (e.g. with diameter of 1 mm) unwound from reels located on suitable rotating cages and applied helicoidally on said core. In general, in such cases it is also necessary to apply a counterspiral (for example represented by a copper tape with thickness of 0.1–0.2 mm) whose function is to hold the aforementioned copper wires in position during the next production steps. Once completed, the intermediate obtained so far, i.e. core and metallic screen, is stored on a second collecting reel.

According to the present invention, the next step is production of the water swellable layer (21) in a further, different production line where the aforementioned intermediate is unwound from said second reel. The polymeric material of the water swellable layer is mixed beforehand with the water swellable material and any additives according to known methods in the art. For example, mixing can be effected in an internal mixer of the type with tangential rotors (Banbury) or with co-penetrating rotors, or in continuous mixers such as those of the Ko-Kneader type (Buss) or of the type with co-rotating or counter-rotating double screws.

Once mixing has been effected, the water swellable layer, i.e. the layer of expanded polymeric material in which the water swellable material is embedded, is obtained by an extrusion operation carried out directly on the aforementioned intermediate. Said extrusion operation thus produces said water swellable layer in a position radially external to the metallic screen.

Expansion of the polymer is effected during the extrusion step. Said expansion can be effected either chemically, by adding a suitable expanding agent, i.e. capable of evolving a gas under defined conditions of pressure and temperature, or physically, by injecting gas at high pressure directly into the barrel of the extruder.

Examples of suitable expanding agents are: azodicarbamide, paratoluene sulphonylhydrazide, mixtures of organic acids (e.g. citric acid) with carbonates and/or bicarbonates (e.g. sodium bicarbonate), and the like.

Examples of gases that can be injected at high pressure into the extruder barrel are: nitrogen, carbon dioxide, air, low-boiling hydrocarbons, e.g. propane or butane, halogenated hydrocarbons, e.g. methylene chloride, trichlorofluoromethane, 1-chloro-1,1-difluoroethane, and the like, or their mixtures.

Preferably, the die of the extruder head has a diameter slightly lower than the final diameter of the cable with expanded covering that it has to be obtained, in such a way that expansion of the polymer outside the extruder results in attainment of the desired diameter.

It has been observed that, in the same extrusion conditions (such as rotary speed of the screw, speed of the extrusion line, diameter of the extruder head) one of the process variables having most influence on the degree of expansion is the extrusion temperature. In general, for extrusion temperatures below 130° C. it is difficult to obtain a sufficient degree of expansion; the extrusion temperature is preferably at least 140° C., and in particular about 180° C. Normally, an increase in extrusion temperature corresponds to a higher degree of expansion.

Furthermore, it is possible to control the degree of expansion of the polymer to some extent by acting upon the cooling rate. In fact, by delaying or by suitably speeding up the cooling of the polymer forming the expanded covering as it leaves the extruder, it is possible to increase or decrease the degree of expansion of said polymer.

According to the present invention, the degree of expansion can vary from 5% to 500%, preferably from 10% to 200%, and even more preferably between 10% and 50%.

As disclosed above, the expanded polymeric material can be cross-linked or uncross-linked. Cross-linking is effected, after the steps of extrusion and expansion, according to known techniques, in particular by heating in the presence of a radical initiator, for example an organic peroxide such as dicumyl peroxide. Alternatively, cross-linking can be effected using silanes, which envisages the use of a polymer belonging to the group mentioned above, in particular a polyolefin, to which are joined, covalently, silane units comprising at least one hydrolysable group, for example trialkoxysilane groups, in particular trimethoxysilane. Grafting of the silane units can take place by a radical reaction with silane compounds, for example methyltriethoxysilane, dimethyldiethoxysilane, vinyldimethoxysilane, and the like. Cross-linking is effected in the presence of water and of a cross-linking catalyst, for example an organic titanate or a metallic carboxylate. Dibutyltin dilaurate (DBTL) is especially preferred.

The Applicant has observed that it is possible for the polymeric material undergoing expansion to be mixed mechanically, especially in the case of olefinic polymers, specifically polyethylene or polypropylene, with a predetermined amount of rubber in the form of powder, for example vulcanized natural rubber.

Typically these powders are formed of particles with sizes between 10 µm and 1000 µm, preferably between 300 µm and 600 µm. Scrap vulcanized rubber obtained from tyre manufacturing can be used advantageously. The percentage of rubber in the form of powder can vary from 10 wt. % to 60 wt. % relative to the polymer to be expanded, and is preferably between 30% and 50%.

The thickness of the water swellable layer according to the present invention is preferably between 0.3 mm and 6 mm, and more preferably between 1 mm and 4 mm.

In a position radially external to said water swellable layer it is possible, as already stated, to position a tubular covering (not shown) consisting, for example, of an aluminium, lead or copper sheath (for example using extrusion presses), or one or more strips of aluminium or steel with overlap of the edges and their longitudinal gluing or welding by means of suitable equipment, for example of the laser type.

In the case (not shown) when the cable also has a metallic armour, the production process envisages placing said armour on the outer surface of the water swellable layer for example by means of a wire or tape armouring machine operating according to the same principle as the screening machines mentioned above.

Finally, the cable obtained so far is covered with an outer polymeric sheath, which can be obtained for example by extrusion of a polymeric material, usually polyvinyl chloride or polyethylene.

For further description of the invention, some illustrative examples are given below.

EXAMPLE 1

A mix was prepared suitable for making a water swellable layer according to the present invention, i.e. a layer of an expanded polymeric material with a water swellable material embedded within it so as to provide a barrier to water penetration into a cable. The composition of said mix is shown in Table 1 (expressed in parts by weight per 100 parts by weight of base polymer, or phr).

The components of the mix were mixed in a closed mixer of the Werner type (6 litres of useful volume), loading the base polymer, the water swellable powder and the other additives simultaneously; mixing was effected for approx. 5 minutes. At the end of this operation the mix, discharged at a temperature of about 210–220° C., was then further mixed in an open mixer. The strips of mix obtained downstream from said open mixer were then submitted to a pelletizing operation.

TABLE 1

| Santoprene ® 201/121-68 W228 | 50 |
|---|---|
| Profax ® PF 814 | 50 |
| Waterlock ® J550 | 40 |

Santoprene® 201/121-68 W228 (Advanced Elastomer System): thermoplastic rubber with density of 0.97 kg/l, hardness 68 Shore A (measured according to standard ASTM D2240), compression set at 23° C. (168 h) of 23% (measured according to standard ASTM D395, method B);

Profax® PF 814 (Montell): homopolymer of isotactic propylene with structure with high degree of branching (MFI=3 g/10'-ASTM D1238);

Waterlock® J550 (Grain Processing Co.): cross-linked polyacrylic acid (partially salified) (more than 50 wt. % of particles with diameter between 10 and 45 µm).

EXAMPLE 2

Production of a medium-voltage cable was undertaken according to the design shown in FIG. 2.

Each of the three cores of said cable consisted of a copper conductor with cross section equal to 150 mm$^2$, covered with the following layers cross-linked with peroxide on a catenary line:
- an inner semiconducting layer based on EPR (thickness 0.5 mm);
- an insulating layer based on EPR (thickness 6.5 mm);
- an outer semiconducting layer based on EVA (thickness 0.5 mm).

Then said cores (each with outer diameter of about 65 mm) were covered, by extrusion, with a layer of filler based on EPR, filled with calcium carbonate and paraffin, so as to obtain a thickness of filler equal to about 0.7 mm in the portion radially external to said cores, i.e. on the outer surfaces of the latter. The filler was deposited using a 160 mm single-screw extruder in 20 D configuration, with rotary speed of the screw of about 6 rev/min.

Then the layer of filler was covered with the water swellable layer with the composition stated in Example 1 of Table 1, obtaining a thickness of said layer equal to 2 mm. Extrusion was carried out using a 120 mm single-screw extruder in 20 D configuration, with said screw running at a rotary speed of about 10 rev/min. The extruder was equipped with an initial section of the barrel with longitudinal flutes, feed opening of the box type and screw with transfer thread of length 20D. Screw channel depth was equal to 10 mm in the feed zone and equal to 7 mm in the end section, with an overall compression ratio of the screw of about 1:1.42. The pressure in the extrusion head, measured in the correspondence of the connecting zone between the extrusion head and the body of the extruder, was 55 atm.

The input of the motor of the extruder was 60 A.

The extrusion step was preceded by a filtration step of the material according to the composition of Example 1, said filtration being effected by using a filter of type 50 NIT (mesh count in 50 linear mm).

Downstream from the extruder, an electrically heated orthogonal extrusion head is then used, equipped with a double suture line conveyor. The following die assembly was used: male with 67 mm diameter, female of compression type with 69.5 mm diameter.

In the step of deposition of the water swellable layer according to the present invention, the thermal profile given in Table II was used in the extruder and in the extrusion head.

TABLE II

| Extruder zone | Temperature (° C.) |
|---|---|
| Feed opening | 25 |
| Screw | Neutral |
| Zone 1 | 210 |
| Zone 2 | 195 |
| Zone 3 | 175 |
| Zone 4 | 160 |
| Body | 160 |
| Neck | 180 |
| Conveyor | 180 |
| Die | 210 |
| Collar | 170 |

The feed rate of the cable to be covered, obtained so far, i.e. core with metallic screen and layer of filler, was set in relation to the required thickness of water swellable layer. In the case under consideration, a line speed of 2.8 m/min was used, producing, as stated, a thickness of the water swellable layer of 2 mm.

Expansion of the latter was obtained chemically by adding in the hopper 0.5 phr of the expanding agent Hydrocerol® BM 70 (carboxylic acid/sodium bicarbonate), produced by Boehringer Ingelheim.

The material constituting the water swellable layer had a final density of 0.85 kg/l and a degree of expansion of 25%.

In a position radially external to the water swellable layer of the invention, finally an outer polymeric sheath was extruded, based on polyvinyl chloride, by using known extrusion techniques. The rotary speed of the screw of said extruder was 5 rev/min and a thickness of said sheath of about 3.5 mm was produced.

Next the semifinished product was cooled in water and wound on a reel.

Water Penetration Test

A sample of the cable thus obtained, with length of 3 m, was submitted to a water penetration test according to the conditions described below and corresponding substantially to standard ENEL DC4584.

About midway along the length of said sample, the outer polymeric sheath was removed from an annular portion with width of about 50 cm, making the water swellable layer of the present invention visible from the outside, so as to create a passage for water to the interior of the cable.

The testing device comprised a hollow tubular element capable of being positioned concentrically with said sample and externally to it, corresponding to the annular portion removed as above. At each end of said tubular element, a connecting element was positioned, substantially in the shape of a truncated cone, capable of joining said tubular element hermetically to the external surface of the cable in question. Thus said device formed a closed chamber around the sample, precisely in the zone surrounding the portion of cable where the aforementioned annular portion was removed. Said device further comprised a feed duct arranged at right angles to the axis of said chamber, and hence to the cable axis, and able to permit the introduction of water into said chamber and assessment, owing to the hermeticity of the connecting elements, of the penetration rate of the water into the aforesaid cable. Firstly the chamber was filled, via the feed duct, with water at room temperature. In this step there was a waiting time of about 15 minutes, which also included the time required for filling the chamber, leaving the water to remain inside the chamber at atmospheric pressure. Next said feed duct was connected, for example by another pipe, to an external tank containing water at the same temperature so as to give a head of water of 1 m on said cable for a period of 24 h. At the end of this period the sample was removed and analysed for the purpose of determining the level of water penetration into the cable, i.e. the length of cable through which the water passed starting from the cable zone from which the aforementioned annular portion had been removed.

At the end of the 24 h period, the cable sample did not exhibit escape of water from its ends, and it was found that the water had penetrated to the interior of the cable for a portion length of about 230 mm in both directions, starting from the zone of removal of the annular portion.

Impact Strength Test

To evaluate the impact strength, impact tests were carried out on the cable sample and the extent of damage was then evaluated. Said evaluation was based on visual examination of the cable at the point of impact.

Said impact test was based on French standard HN 33-S-52, which envisages subjecting the cable to an impact energy of about 72 Joule (J), obtained by dropping, from a height of 27 cm, an impact testing wedge of 27 kg, the V-shaped end of which had a slightly rounded shape (radius of curvature of 1 mm). For the purposes of the present invention, evaluation of impact strength was based on a single impact.

At the end of the test, both the outer polymeric sheath and the water swellable layer of the invention were removed from the sample so as to evaluate the residual deformation on the filler layer and on the outer semiconducting layer. The sample exhibited a residual deformation on the filler of 0.2 mm, whereas no residual deformation was found on the outer semiconducting layer.

The present invention offers some important advantages relative to the known art mentioned above.

Firstly, as noted above, the production process of a cable according to the present invention is remarkably simplified with rispect to known processes as it has become possible to obtain a continuous layer with properties of a barrier to the water penetration in a position radially external to the metallic screen by means of an extrusion operation which has made it possible to eliminate the taping step of the known art and the notable drawbacks that it involves. Among them, for example, the need to carry out said taping step in an additional, separate stage, thus introducing a discontinuity in the production process which necessarily involves greater capital costs at the plant engineering level, higher maintenance costs, more complex plant logistics, as well as a constant reduction in the capacity of the production process.

The expanded material in which the water swellable powder according to the present invention is embedded makes it possible, instead, to produce the aforementioned water swellable layer continuously by means of an extrusion step advantageously effected on the production line, without any additional stages. Moreover, the water swellable layer can advantageously be co-extruded with the various coating materials composing the cable in question. This means, therefore, carrying out a process of the continuous type with considerable advantages both in terms of plant costs, and in terms of greater productivity owing to the greater simplicity of the process and to the saving of time and means relative to the processes of the known art.

Furthermore, the expanded polymeric material can be used for embedding remarkable amounts of the water swellable material ensuring an effective barrier effect even when there is penetration of an appreciable amount of water into the cable, a situation that does not generally relate to the portion of cable radially internal to the metallic screen where the presence of said screen represents an effective barrier to the water penetration.

A further advantage of the present invention relates to the embodiment in which the water swellable layer also replaces the metallic armour that a cable generally possesses. In that case, in fact, it is possible to replace two different components, i.e. the water swellable tape and the metallic armour, with a single component, i.e. the water swellable layer, which performs the dual function of barrier to water penetration and impact-resistant reinforcing layer. The aforementioned embodiment leads to a further simplification of the production process as well as to the production of a more economical and lighter type of cable which, nevertheless, is able to guarantee excellent results both in terms of impact strength and in terms of barrier to water penetration.

What is claimed is:

1. An electric cable comprising at least one conductor, an insulating covering, a metallic screen positioned externally to said insulating covering and at least one water swellable layer arranged in a position radially external to said metallic screen, said at least one water swellable layer comprising a continuous layer of pre-expanded polymeric material uniformly distributed along the longitudinal direction of said cable in which a water swellable material is embedded, said pre-expanded polymeric material having a degree of expansion between 5% and 500%.

2. An electric cable according to claim 1, comprising at least two conductors, each of which is provided with an insulating covering and with a metallic screen positioned externally to said insulating covering, a filler arranged externally to each metallic screen to give said cable a structure of circular cross section, and at least one water swellable layer comprising an pre-expanded polymeric material in which a water swellable material is embedded and arranged in a position radially external to said structure.

3. An electric cable according to claim 1, wherein said degree of expansion is between 10% and 200%.

4. An electric cable according to claim 1, wherein said degree of expansion is between 10% and 50%.

5. An electric cable according to claim 1, wherein said at least one water swellable layer has a thickness between 0.3 mm and 6 mm.

6. An electric cable according to claim 5, wherein said thickness is between 1 mm and 4 mm.

7. An electric cable according to claim 1, wherein said at least one water swellable material is a polymer possessing hydrophilic groups along the polymeric chain.

8. An electric cable according to claim 7, wherein the amount of said at least one water swellable material is between 1 phr and 120 phr.

9. An electric cable according to claim 8, wherein said amount is between 5 phr and 80 phr.

10. An electric cable according to claim 1, wherein said pre-expanded polymeric material comprises an expandable thermoplastic polymer selected from polyolefins, copolymers of various olefins, olefins/unsaturated esters copolymers, polyesters, polycarbonates, polysulphones, phenolic resins, urea resins, and their mixtures.

11. An electric cable according to claim 10, wherein said pre-expanded polymeric material is a polyolefinic polymer or copolymer based on ethylene, propylene or ethylene and propylene.

12. An electric cable according to claim 11, wherein said pre-expanded polymeric material is selected from:
  (a) copolymers of ethylene with an ethylenically unsaturated ester, in which the amount of unsaturated ester is between 5 wt. % and 80 wt. %;
  (b) elastomeric copolymers of ethylene with at least one $C_3$–$C_{12}$ α-olefin, and optionally a diene, having the following composition: 35–90 mol. % of ethylene, 10–65 mol. % of α-olefin, 0–10 mol. % of diene;
  (c) copolymers of ethylene with at least one $C_4$–$C_{12}$ α-olefin, and optionally a diene, generally with a density of between 0.86 and 0.90 g/cm$^3$; and
  (d) polypropylene modified with ethylene/$C_3$–$C_{12}$ α-olefin copolymers, where the weight ratio between polypropylene and the ethylene/$C_3$–$C_{12}$ α-olefin copolymer is between 90/10 and 30/70.

13. An electric cable according to claim 12, wherein the amount of unsaturated ester in the copolymers of ethylene with an ethylenically unsaturated ester is between 10 wt. % and 50 wt. %.

14. An electric cable according to claim 12, wherein the weight ratio between polypropylene and the ethylene/$C_3$–$C_{12}$ α-olefin copolymers is between 50/50 and 30/70.

15. An electric cable according to claim 1, wherein said at least one water swellable layer is obtained by extrusion.

16. An electric cable according to claim 15, wherein expansion of said at least one water swellable layer is effected during said extrusion by adding an expanding agent.

17. An electric cable according to claim 16, wherein said expansion is obtained by injecting a gas at high pressure.

18. An electric cable according to claim 16, wherein after expansion, said pre-expanded polymeric material is submitted to cross-linking.

19. An electric cable according to claim 1, further comprising a tubular covering arranged in a position radially external to said at least one water swellable layer.

20. An electric cable according to claim 19, wherein said tubular covering is a thin foil comprising aluminum, lead or copper.

21. An electric cable according to claim 1, further comprising a metallic armor arranged in a position radially external to said at least one water swellable layer.

22. A method of blocking the longitudinal flow of water that has accidentally penetrated to the interior of an electric cable, in a portion of the latter that is radially external to at least one metallic screen possessed by said cable, comprising providing a water swellable layer in a position radially external to said at least one metallic screen, said water swellable layer comprising a pre-expanded polymeric material in which a water swellable material is embedded, said pre-expanded polymeric material having a degree of expansion between 5 and 500%.

23. A method according to claim 22, wherein said water swellable layer is distributed continuously and uniformly.

24. A method according to claim 22, wherein said water swellable layer is obtained by extrusion.

25. A method according to claim 24, wherein said water swellable layer is co-extruded with an outer polymeric covering possessed by said cable.

* * * * *

UNITED STATES PATENT AND TRADEMARK OFFICE
CERTIFICATE OF CORRECTION

PATENT NO. : 7,087,842 B2
APPLICATION NO. : 10/168065
DATED : August 8, 2006
INVENTOR(S) : Sergio Belli et al.

It is certified that error appears in the above-identified patent and that said Letters Patent is hereby corrected as shown below:

Title page, item (57), delete the Abstract in its entirety and insert therefor:
-- An electric cable, in particular for power transmission or distribution at medium or high voltage, having a metallic screen and a water swellable layer capable of forming a barrier to water penetration provided in a position radially external to the metallic screen. The water swellable layer is made of an expanded polymeric material in which a water swellable material, preferably in the form of powder, is embedded.--.

Signed and Sealed this

Twenty-ninth Day of May, 2007

JON W. DUDAS
*Director of the United States Patent and Trademark Office*